US008058188B2

(12) United States Patent
Salitsky et al.

(10) Patent No.: US 8,058,188 B2
(45) Date of Patent: Nov. 15, 2011

(54) THERMALLY SPRAYED PROTECTIVE COATING FOR INDUSTRIAL AND ENGINEERED FABRICS

(75) Inventors: Joseph Salitsky, Mansfield, MA (US); Bo-Christer Aberg, Halmstad (SE)

(73) Assignee: Albany International Corp, Albany, NY (US)

( * ) Notice: Subject to any disclaimer, the term of this patent is extended or adjusted under 35 U.S.C. 154(b) by 394 days.

(21) Appl. No.: 11/104,859

(22) Filed: Apr. 13, 2005

(65) Prior Publication Data

US 2006/0234575 A1 Oct. 19, 2006

(51) Int. Cl.

| | |
|---|---|
| ***B32B 3/00*** | (2006.01) |
| ***B32B 5/02*** | (2006.01) |
| ***B32B 27/12*** | (2006.01) |
| ***D03D 25/00*** | (2006.01) |
| ***B05D 1/08*** | (2006.01) |
| ***B05D 1/10*** | (2006.01) |
| ***H05H 1/26*** | (2006.01) |

(52) U.S. Cl. ............ 442/59; 442/85; 442/148; 442/181; 162/902; 427/446; 427/447

(58) Field of Classification Search .............. 442/68–75; 162/902–904; 427/77, 78, 421.1, 446
See application file for complete search history.

(56) References Cited

U.S. PATENT DOCUMENTS 4,439,481 A * 3/1984 Johnson et al. ............... 442/271
4,626,476 A 12/1986 Londry et al.
4,981,745 A * 1/1991 Lefkowitz ..................... 428/147
5,084,326 A 1/1992 Vohringer ..................... 428/194
5,094,877 A 3/1992 Bieringer et al.
5,298,124 A 3/1994 Eklund et al.
5,387,172 A * 2/1995 Habenicht et al. .............. 492/50
5,614,267 A * 3/1997 Howlett ......................... 427/447
5,989,651 A 11/1999 Sayers et al.
6,025,034 A * 2/2000 Strutt et al. ................... 427/450
6,146,462 A 11/2000 Yializis et al.
6,197,158 B1 3/2001 Steiner .......................... 162/205
6,287,687 B1 9/2001 Yializis et al.
6,342,272 B1 1/2002 Halliwell
6,465,074 B1 10/2002 FitzPatrick et al.
6,699,368 B2 3/2004 Ishii et al.
7,157,117 B2 * 1/2007 Mikhael et al. ............ 427/255.6
7,413,633 B2 * 8/2008 Li et al. ...................... 162/358.4
2002/0060052 A1 * 5/2002 Best ........................... 162/358.4
2002/0152630 A1 10/2002 Lindsay et al.
2003/0165689 A1 * 9/2003 Miller et al. .................. 428/419
2004/0126544 A1 7/2004 Jaglowski et al. ............ 428/196

FOREIGN PATENT DOCUMENTS

EP 0 493 756 A1 12/1991
EP 0 815 948 A 1/1998
GB 980057 A 6/1961
WO WO 99/05358 2/1999
WO WO 2006/030066 A1 3/2006

* cited by examiner

*Primary Examiner* — Angela Ortiz
*Assistant Examiner* — Jennifer Steele
(74) *Attorney, Agent, or Firm* — Frommer Lawrence & Haug LLP; Ronald R Santucci

(57) ABSTRACT

A fabric or belt and a method for forming such a fabric or belt, including a base support structure and at least one coating with the coating being applied by a thermal spray process.

17 Claims, 6 Drawing Sheets

THERMALLY SPRAYED PROTECTIVE COATING FOR INDUSTRIAL AND ENGINEERED FABRICS

FIELD OF THE INVENTION

The present invention relates to industrial and engineered fabrics and belts. More specifically, the present invention relates to fabrics and belts and methods of modifying them using thermal spray processes.

BACKGROUND OF THE INVENTION

The present invention relates to the papermaking arts including fabrics and belts used in the forming, pressing and drying sections of a paper machine, and to industrial process fabrics and belts, engineered fabrics and belts, along with corrugator belts generally.

The fabrics and belts referred to herein may include those also used in the production of, among other things, wetlaid products such as paper and paper board, and sanitary tissue and towel products made by through-air drying processes; corrugator belts used to manufacture corrugated paper board and engineered fabrics used in the production of wetlaid and drylaid pulp; in processes related to papermaking such as those using sludge filters and chemiwashers; and in the production of nonwovens produced by hydroentangling (wet process), meltblowing, spunbonding, airlaid or needle punching. Such fabrics and belts include, but are not limited to: embossing, conveying, and support fabrics and belts used in processes for producing nonwovens; and filtration fabrics and filtration cloths.

Such belts and fabrics are subject to a wide variety of conditions for which functional characteristics need to be accounted. For example, during the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. The yarns of the fabric that run along the direction of paper machine operation are referred to as the machine direction (MD) yarns; and the yarns that cross the MD yarns are referred to as the cross machine direction (CD) yarns. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Traditionally, press sections have included a series of nips formed by pairs of adjacent cylindrical press rolls. In recent years, the use of long nip presses has been found to be advantageous over the use of nips formed by pairs of adjacent press rolls. This is because the longer the time a cellulosic fibrous web can be subjected to pressure in the nip, the more water can be removed there, and, consequently, the less water will remain behind in the web for removal through evaporation in the dryer section. A commonly used type of long nip press is the shoe type long nip press, or "shoe nip press."

In the shoe nip press, the nip is formed between a cylindrical press roll and an arcuate pressure shoe. The latter has a cylindrically concave surface having a radius of curvature close to that of the cylindrical press roll. When the roll and shoe are brought into close physical proximity with one another, a nip, which can be five to ten times longer in the machine direction than one formed between two press rolls, is formed. This increases the so-called dwell time of the cellulosic fibrous web in the long nip while maintaining an adequate level of pressure per square inch of pressing force. The result of this long nip technology has been a dramatic increase in dewatering of the cellulosic fibrous web in the long nip when compared to conventional press nips on paper machines.

The shoe nip press requires a special belt, such as that taught for example in commonly assigned U.S. Pat. No. 6,465,074 to Fitzpatrick. This belt is designed to protect the press fabric supporting, carrying and dewatering the cellulosic fibrous web from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

In addition to being useful in shoe nip presses, the present invention also relates to other papermaking, paper-processing, and industrial applications. The present invention contemplates fabrics and belts including forming, press and dryer fabrics, other belts used in papermaking and industrial processes, and other engineered fabrics. In this regard, as part of the manufacturing steps for paper for example, and also for some fabrics, the surface of the paper or a fabric may be smoothed by a calendering process. Calendering can be performed by a belt roll calendar or a shoe nip calendar as well as other methods known to those of skill in the art.

The calendering process smoothes or glazes the paper by pressing it between two rolls or pressing it between a roll and a shoe to smooth, glaze or thin the paper web. In most instances there is also an application of heat to the paper being calendered. An arrangement similar to the long nip press may be employed in calendering the paper web. The paper to be calendered is placed under tension and is compressed or calendered to obtain the desired thickness and gloss characteristics. A belt that is used in such a process is under a number of stresses that require different attributes of the belt to prevent its failure; that is, amongst them being resistance to thermal degradation, resistance to abrasion, and resistance to flexure and compression fatigue. One aspect of the present invention is directed to providing an efficient method of applying materials to a fabric or belt to improve resistance to the failure caused by the environmental factors it will be subjected to during its use.

Industrial fabrics often include a number of layers. The industrial fabric may include a base fabric or support structure as one layer. Often the base fabric may be woven. The fabrics may take the form of an endless loop either by being woven or formed as an endless loop, or by seaming the fabrics into an endless loop.

Fabrics such as press fabrics may have one or more layers of batt fibers applied by needling. Corrugator belts used in corrugator machines to make corrugated paperboard also usually have an endless support structure and one or more layers of batt applied by needling.

Structures to be used as belts in papermaking such as shoe press belts, transfer belts, and calender belts usually will have one or more surfaces coated with a resin to at least partially impregnate the support structure making the belts impervious to water and oil. Other process belts such as some transfer belts may still have a resin coating, but will have either a degree of porosity and/or porosity and permeability to fluids such as water.

In processes associated with the production of paper, these fabrics and belts can wear and in the case of dryer fabrics and calender belts especially, suffer from thermal degradation. For example, in calendering operations the rolls are routinely heated up to 250° C. and in some known applications temperatures of 300° C. are anticipated. These temperatures cause the calender belt surface resin to degrade over time, leading to extensive boundary cracking and potential delamination, limiting its useful life. As a result, fabrics and belts operating under these conditions are in need of thermal protection.

To minimize wear and thermal degradation, papermaking process belts may include an outer synthetic resin layer having improved thermal degradation, abrasion, or resistance to compressive fatigue. For example, current calender belts are composed of a flexible urethane or rubber-like resin layer applied to a reinforcing yarn structure. The elasticity or the hardness of the layer may be adjusted in accordance with the type of resin used. Generally, the lower the hardness, the better the smoothness and gloss of the paper sheet. But when the hardness of the resin is too low, plastic deformation may occur and the life of the belt may be shortened through use. On the other hand, where the hardness of the resin is too great, other problems can be found such as inflexibility, and a shortened belt lifespan due to cracking of the hardened resin.

In general and also by way of background, the production of nonwoven products is also well known in the art. Such products are produced directly from fibers without conventional spinning, weaving or knitting operations. Instead, they may be produced by spunbonding or meltblowing processes in which newly extruded fibers are laid down on an engineered fabric to form a web while still in a hot, tacky condition following extrusion, whereby they adhere to one another to yield an integral nonwoven web. Nonwoven products may also be produced by air-laying or carding operations where the web of fibers is partially consolidated, subsequent to deposition a second operation such as needling or hydroentangleing which produces the final nonwoven product. In the latter, high-pressure water jets are directed vertically down onto the web to entangle the fibers with each other. In needling, the entanglement is achieved mechanically through the use of a reciprocating bed of barbed needles which force fibers on the surface of the web further thereinto during the entry stroke of the needles. The support fabric for all these processes are exposed to some degree of frictional abrasion. Also the belts and fabrics may partially fill with contaminants. These contaminants are typically particles of the particular manufacturing process such as particles of the polymer itself, lattices, additives, etc., that adhere to the surface of the fabric and need to be removed.

Corrugator belts run on a corrugator machine and are used to manufacture corrugated paper board. These belts are exposed to a hot, wet environment as well as abrasion as they pass over stationary elements. Surface contamination, particularly with starch, is also a problem.

Due to the severe operating environment in which many fabrics and belts operate, the above considerations need to be taken into account to achieve desired functional characteristics. In one aspect of the present invention a surface layer is applied to the fabric or belt, which layer can be organic or inorganic, and is applied via thermal spray that will enhance its desired properties.

Accordingly, there is a need for fabrics and belts having improved functional characteristics. Further, there is a need for an improved method of applying materials to fabrics and belts to achieve these goals in an efficient and economical fashion.

SUMMARY OF THE INVENTION

It is the object of the present invention to provide a fabric or belt having improved functional characteristics.

It is another object of the present invention to provide an efficient and cost effective method of modifying a fabric or belt having improved functional characteristics.

The present invention is directed to a fabric or belt and method of modifying such fabric or belt. The fabric or belt includes or comprises a base support structure and at least one coating or layer with the coating or layer being applied by a thermal spray process over the support structure or at discrete locations thereof or depositing discrete particles thereon.

Another aspect of the invention is the use of thermal spray processes such as a flame spray process, electric wire arc spray process, a plasma spray process, a detonation gun deposition process, a cold spray process or a high velocity oxygen fuel combustion spray process for application of the coating to the base support structure or on to another layer, e.g., a resin layer, on the fabric or belt.

The present invention will now be described in more complete detail with frequent reference being made to the figures, which are listed and identified below.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Figure 1:
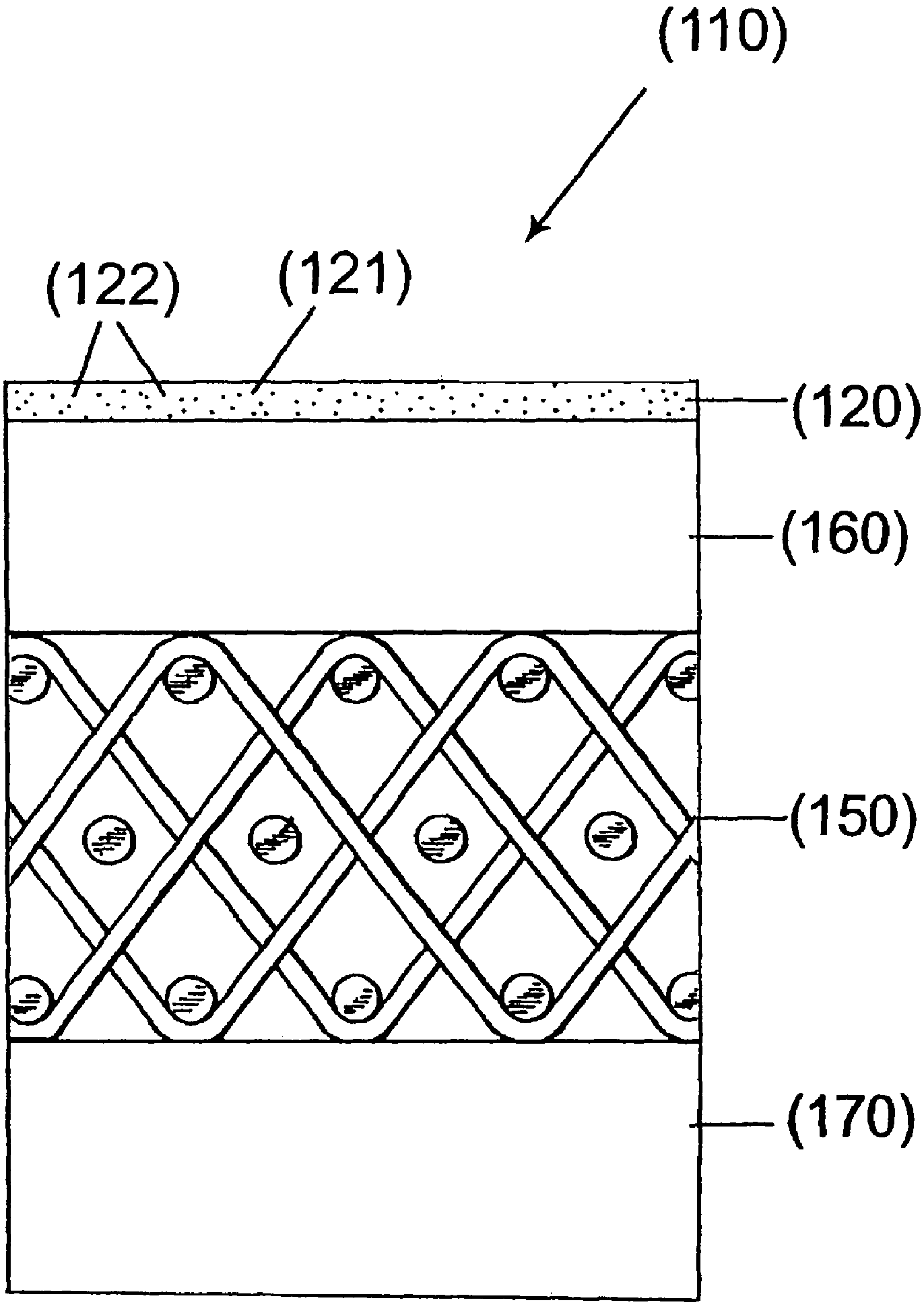
FIG. 1 is a cross sectional view of a belt with an embodiment of the present invention.

The present invention may be used in a variety of applications and industries requiring fabrics or belts including but not limited to industrial fabrics or belts, engineered fabrics or belts, papermachine clothing (PMC) and includes the types of fabrics and belts as aforesaid. Note as earlier mentioned, such a fabric or belt includes or comprises a base support structure, which may itself be sprayed or coated to create a layer thereon or at discrete locations thereon or depositing discrete particles thereon in accordance with the present invention. It should be noted that the terms coating and layer may be used somewhat interchangeably herein. Coating can be used to create a layer. Accordingly, the context in which the term is used and the intended meaning being conveyed will be apparent to one skilled in the art.

The characteristics or functions of the fabric, belt or even component thereof envisioned to be affected by the thermal spraying include functional properties that may be provided to the fabric or belt by thermal spraying, such as abrasion resistance, thermal resistance, oxidation resistance (particularly as a barrier to chlorine or peroxide), chemical resistance (particularly as a barrier to acids or bases), a moisture barrier (or reduced sensitivity to moisture, and increased dimensional stability), thermal conductivity, electrical conductivity, balancing of hydrophobic and hydrophilic properties (for, for example, cleanability), enhancing or reducing coefficients of friction (for, for example, sheet handling) as desired for a particular process, and the creation of microtopology on the fabric (in the range of, for example, 1-50 microns).

For example and strictly for purposes of illustration, the present invention may be used on a belt operable on a shoe type calender. A shoe type calender includes a cylindrical press roll and an arcuate pressure shoe which together define a nip there between. In such a situation, the belt passes through the nip in direct sliding contact with the arcuate pressure shoe, and separates a fibrous web, from the arcuate pressure shoe, thereby protecting the fibrous web, from damage by direct sliding contact with the arcuate pressure shoe and from contamination by any lubricant on the arcuate pressure shoe. Such a belt may also be used in other papermaking and paper processing applications such as shoe press belts or transfer belts.

Fabrics and belts incorporating the present invention may include or comprise a base support structure. The fabrics and belts may also include a coating. The coating can result in the formation of a film or layer located partially on or near the surface of the fabric or belt or on discrete locations thereof or depositing discrete particles thereon. The coating may be applied directly to yarns so that the individual yarns appear in cross-section as a sheath on core yarn. Still further, the coating may be applied to fabrics and belts so as to coat the individual yarns but not create a layer of the fabric or belt. In one example of such applications, the yarns of the fabric or belt, and the crossovers or knuckles are sheathed in the coating material, but the coating may not close openings between the MD and CD yarns so as to create a layer on the fabric or belt.

The coating may be of materials such as thermoplastic type resin or a thermoset-type resin, such as melt processible polyamides, nylons, polyesters, polypropylene, polyethylene, ethylene vinyl alcohols, aramids, melt processible fluoropolymers, such as PEF (perflorinated ethylene-propylene), ETFE (ethylene and tetrafluoroethylene) and PVDF (polyvinylidene fluoride), polymethylmethacrylate (PMMA), polyetheretherketone (PEEK), and other suitable materials known in the art, such as silicone or rubber type compounds. Other materials may not be melt processible but envisioned in the instant application, such as Teflon® (PTFE) and UHMW polyethylene, which may be applied to form a continuous layer. The thermoplastic or thermoset resin may have high resistance to heat, on the order of 350° C. or more. Note, however, the use of other materials is considered within the scope of the present invention.

The coating materials may in some instances also include either or both organic and inorganic particles, nanometric size or larger up to several hundred microns or more. The inorganic particles may include metals, metal oxides, or the like. These particles may be applied directly or mixed with a coating material, typically before application to the fabrics or belts, so that the coating materials and the particles may form a coherent matrix in which the particles may be substantially distributed, embedded or dispersed throughout the coating. The inclusion of such particles in a coating matrix for example would substantially increase certain functional properties aforenoted thereof. For example, it has been found that the use of certain metals in the coating can increase the wear resistance of the coating materials.

One of the layers of the fabric or belt may include or comprise a base support structure having an inner surface and an outer surface, respectively corresponding to the back or machine side and the sheet side of the fabric or belt. The base support structure provides support for the fabric or belt, which ensures structural strength and dimensional stability. In some applications, the base support structure may provide sufficient void volume for the removal of water from a paper sheet, such as in a forming or dryer fabric or alternatively the structure may function as an engineered fabric for the formation of nonwoven products.

In other applications the base support structure provides the surface area onto which polymeric resin layer or layers are applied. Such layers may be applied by conventional methods in combination with thermal spraying or by thermal spraying alone or any combination of methodologies. For example, a polymer resin layer may be coated onto or impregnated into the outer and/or inner surfaces of the base support structure by a conventional method to create a layer or layers thereof that render it impermeable to fluids, such as oil, water, chemicals, and the like. Further, additional layers may be applied by thermal spraying on the base support structure indirectly by being applied to an earlier coating depending on the application of the fabric or belt. Such additional layers may include polymer resins that provide further functional properties of the type aforenoted. Accordingly, one or more layers may be applied to the base support structure or at desired discrete locations thereof, or the depositing of discrete particles thereon, for example, to provide a hydrophobic area and a hydrophilic area.

The base support structure may include woven, and/or nonwoven materials such as knitted, extruded mesh, spiral-link, MD and/or CD yarn arrays, spiral wound strips of woven and nonwoven materials or of any other structure suitable for the purpose. The base support structure may also include yarns of monofilament, plied monofilament, multifilament or plied multifilament, and may be single-layered, multi-layered or laminated. The yarns may be extruded from any one of the synthetic polymeric resins, such as polyamide and polyester resins, in a manner which may be known to those of ordinary skill in the industrial fabric arts or may be metal.

The base support structure may further include a staple fiber batt needled or otherwise entangled into and onto the structure. The fiber batt may comprise staple fibers of polymeric resin materials such as polyamide or polyester, or any of the other materials commonly used for this purpose.

As aforesaid, the thermal sprayed coating material can be organic or inorganic, it may be a resin with the resin containing organic or inorganic particles. In one advantageous embodiment of the present invention, the coating composition of the present invention may comprise a thermoplastic or a thermoset resin and functional inorganic particles forming a coherent matrix.

Also, the coating material can be just organic particles that themselves form a coating that can be continuous; discontinuous (discrete locations) or even individual particles. Also, the coating material can be an organic polymer resin that contains either other organic, inorganic, metal or other particles, individually or some combination thereof, that can be continuous, discontinuous (discrete locations) or even individual particles of nanometric or larger size. Moreover, the coating can be the inorganic or metallic particles themselves that can be continuous, discontinuous (discrete locations) or even individual particles of nanometric or larger size.

The functional inorganic particles used in the present coating may include anionic inorganic particulate materials. Such anionic inorganic particles may include anionic silica-based particles, alumina, titania and zirconia, e.g., clay. "Clay" can be a mixture of different inorganic particles; "China" clay has a specified composition of the materials discussed above, e.g., can be presented independently of any other material as well.

Additionally, the inorganic particles may have a nanometric size or the particles may be of a larger size as dictated by the application. It should be further understood that the nanometric sized particles used in the present invention may range in median or average size from about, for example, 1 nanometer to a suitable limit based on coating thickness. As is to be appreciated, the suitable limit based on coating thickness would be readily apparent to those skilled in the art, e.g. several hundred microns. One example is an anionic inorganic particles having an average particle size of approximately 7 nm. As conventional in silica chemistry, the particle size refers to the average size of the primary particles, which may be aggregated or non-aggregated. The functional inorganic particles may be in the form of colloidal dispersions or solids.

In some embodiments of the present invention the coating thickness may be approximately between 0.1-10 mm, and is preferable between 0.2-0.4 mm. However, there is no practical upper limit of the coating thickness. The coating either with or without nanometric particles is directed towards improving the functional characteristics, as listed above, of the fabrics or belts.

The coatings may be applied to any surface of the fabrics or belts or portion thereof or to create a layer on the fabric or belt by any of a number of methods of thermal spraying known to one of ordinary skill in the art. The thermal spray process may include a flame spray process, electric wire arc spray process, a plasma spray process, a detonation gun deposition process, a cold spray process or a high velocity oxygen fuel (HVOF) combustion spray process.

As an example, during the application operation, the coating material, may which include a resin and functional organic or inorganic particle is fed into a spray gun, instantaneously heated and propelled towards the substrate at a high velocity. The kinetic and/or thermal energy imparted to the coating-particles cause the coating material to be bonded to the substrate.

As mentioned above, one aspect of the present invention is the use of thermal spray processes to apply the coating onto a base support structure of a fabric or belt. For example, an HVOF apparatus may be supplied or charged with the coating material comprising nylon 11 and 5% by volume of 0.7 nm silica, for subsequent spraying onto the structure. The HVOF apparatus may include a spray gun which receives the coating materials separately such as from separate feed lines or containers. Alternatively, the coating materials may be mixed and uniformly distributed therein prior to being supplied to the spray gun. Fuel (kerosene, acetylene, propylene or hydrogen) and oxygen may also be fed into the apparatus where combustion thereof produces a hot high-pressure flame that is forced down a nozzle increasing its velocity. The coating sprayed may be relatively dense, providing acceptable thickness and uniformity.

Optical microscopy may be used to analyze the coating microstructure to determine structure to coating bond integrity; coating thickness; surface roughness; uniformity; coverage and porosity among other desired characteristics.

During coating, the temperature of the structure to be sprayed must not become too high such that it begins to burn and degrade. Accordingly, it may be necessary to supply a tie or bond-coat layer (such as layer 280 in FIG. 2) which may be pre-melted in order to achieve good bonding and particle melting. The bond-coat layer may be applied typically by conventional methods to the surface of the substrate before coating. As an alternative, the tie coat layer may be applied by thermally spraying with a material that has a lower melting point than the substrate material. The bond-coat layer may be composed of a polymeric resin, for example, polyamides or polyurethane or any other material suitable for this purpose as known to those skilled in the art. The thickness of the bond-coat layer may be approximately 0.2 mm and may provide a well-bonded coating interface. Other ways to prevent burning during the coating process would be readily apparent to those skilled in the art and their use is considered within the scope of the present invention.

In another embodiment of the present invention, a fabric or belt is provided comprising at least two layers in which one of the layers comprises a coating material, wherein the coating is applied by a thermal spray process. In such a fabric or belt, the thermal spray process may be used to provide functional enhancements to the fabric or belt of the type aforesaid.

Further, a coating formed from a thermal spray process on a fabric or belt provides a more economical means of preparing structural characteristics for a fabric, for example, fabrics comprising a large number of layers and/or containing very thin layers of materials and/or layers or coatings at discrete locations and/or depositing discrete particles. This would be particularly true for very large fabrics such as those used in papermaking where the conventional coating method may be time consuming for the material being applied or not conducive to the application of certain materials.

In addition, a coating formed from a thermal spray process may be advantageous because a thermal spray process can accurately deposit materials at specific locations in the length, width, or thickness as per the structural design requirements. Further, the thermal spraying process can also provide a means of depositing materials that could not be processed otherwise, for example, materials with a narrow process window or materials, such as aramids. Previously it has not been possible to form an aramid film on or around the surface of a yarn, for example. However, by thermal spraying such a film can be formed. Also, a coating or layer formed from a thermal spray process of the present invention may be a particularly favorable means of optimizing interlayer adhesion by depositing very thin layers of materials that do not normally acceptably adhere to each other. Also, another advantage of thermal spraying is the ability to deposit nanometric particles at desired locations.

Figure 1A:
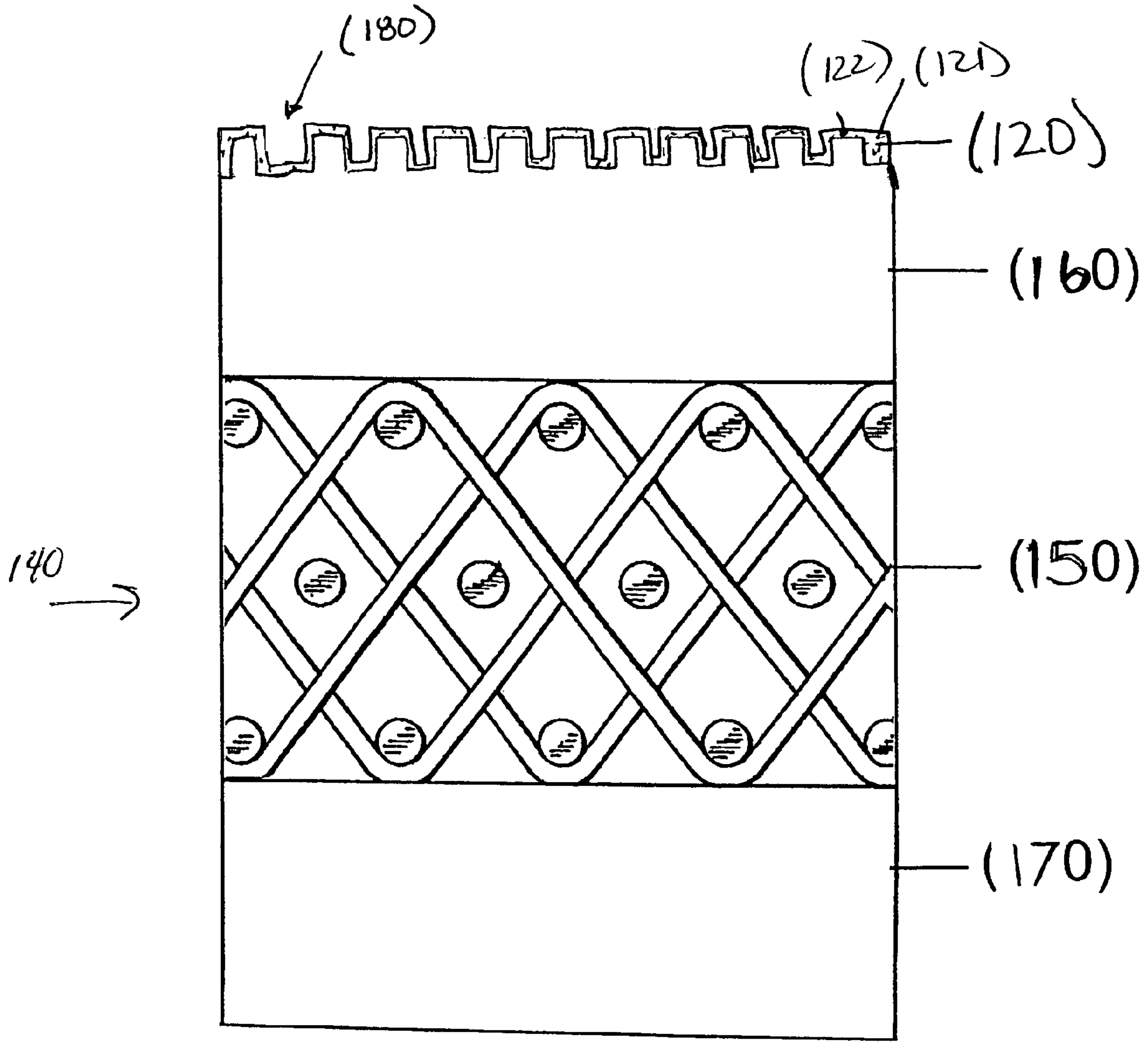
FIG. 1A is a cross sectional view of the belt of FIG. 1 with grooves.

Turning now more particularly to the drawings, FIG. 1 illustrates, by way of example, a cross sectional view of a belt 110 used in the papermaking industry. Such belt is, for example, a shoe press belt. Belt 110 includes base support structure 150 composed of woven yarns and may also contain staple fiber batt (not shown). Base support structure 150 may be respectively coated on its outside and inside surfaces with polymer resins (such as polyurethanes) layers 160 and 170. The polymer resin layers 160 and 170 may be the same or different. Further, each of polymer resin layers 160 and 170 may be impermeable to fluids, even though certain polymers, for example, polyurethane, ultimately allows water to diffuse into the coating to a certain degree, an undesired characteristic. For example, resin layer 170 may be impervious to oil to prevent lubricating oil from penetrating the structure of the belt when the belt is sliding over a shoe during operation. Moreover, the resin layer 160 may have a predetermined thickness so as to permit grooves 180, blind-drilled holes or other cavities or voids to be formed on the outer surface thereof without exposing any part of the woven base support structure, as shown in FIG. 1A. These features provide for the temporary storage of water pressed from the paper web in a press nip. Polymer resins layers 160 and 170 are typically applied to base support structure 150 by conventional coating methods.

In addition, coating 120, which may include thermoplastic resin 121 with or without organic, inorganic or metal particles 122 or a combination thereof or the particles themselves, is applied to layer 160 by a method such as a thermal spray process. Here, inorganic particles 122 may be as aforesaid nanometric sized particles or larger and coating 120 may have an appropriate thickness suitable for the purpose. Coating 120 may be impermeable or substantially impermeable to fluids and impart to the belt any one or more of the functional characteristics aforesaid.

Figure 2:
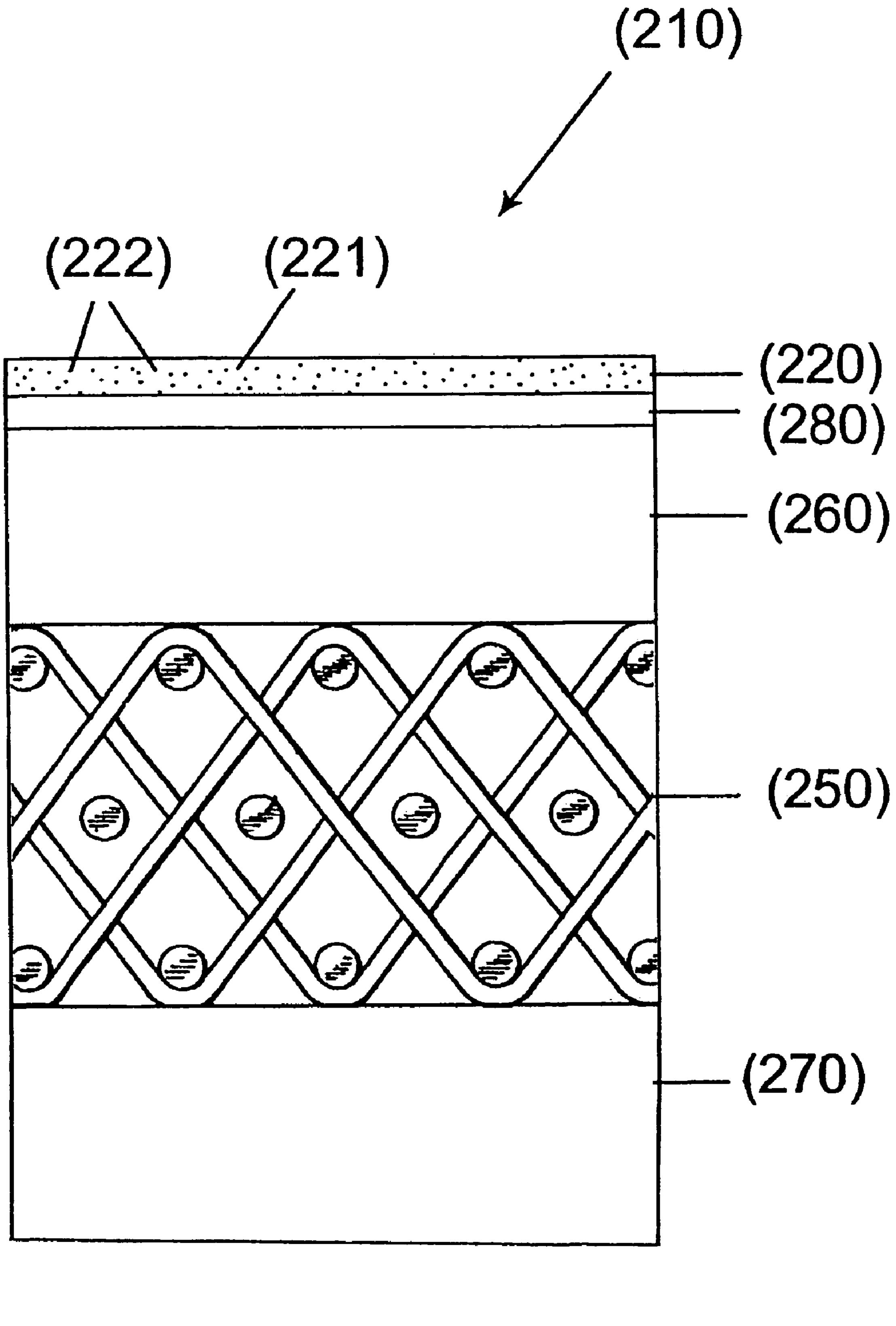
FIG. 2 is a cross sectional view of a belt in accordance with an embodiment of the present invention which may be used in a calendering operation.

FIG. 2 illustrates a cross sectional view of belt 210 composed of a woven base support structure 250, and polymer resin layers 260 and 270 which may be similar to layers 160 and 170 of FIG. 1. Additionally, belt 210 may include a polymer resin layer 280 applied to polymer resin layer 260. Polymer resin layer 280 may provide a bond-coat layer and have thickness of about 0.2 mm. For example, polymer resin layer 280 may be pre-melted to achieve good bonding for coating 220.

Coating 220 may be applied to layer 280 in a manner similar to that described with regard to FIG. 1. The coating 220, as in coating 120, may include thermoplastic resin 221 with or without nanometric or large size particles 222. Coating 220 may also be impermeable or substantially impermeable to fluids.

Figure 3:
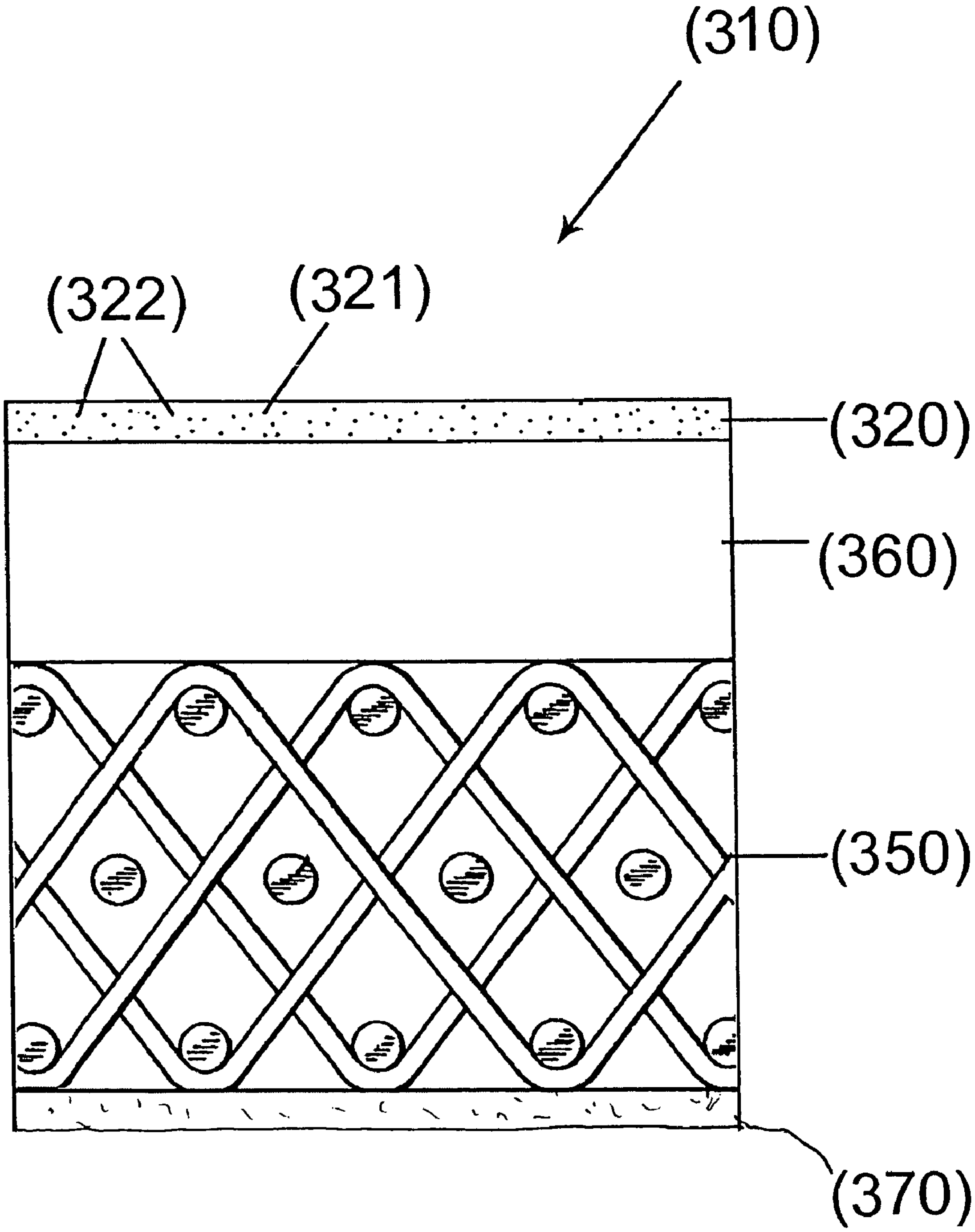
FIG. 3 is a cross sectional view of a belt in accordance with an embodiment of the present invention which may be used in a sheet transfer operation.

Turning now to FIG. 3, it illustrates a cross sectional view of a belt 310 composed of a woven base support structure 350 and polymer resin layer 360 which may be similar to layer 160 of FIG. 1. Coating 320 may be applied to layer 360 in a manner similar to that described with regard to FIG. 1. The coating 320, also may be similar to coating 120, and may be formed of thermoplastic resin 321 either with or without nanometric or larger sized particles 322. The coating 320 may have an appropriate thickness of, for example, approximately 0.3 mm. Coating 320 may similarly be impermeable or substantially impermeable to fluids. In this illustration, the coating or layer 370 on the back or wear side of the fabric is one that may be applied by thermal spraying directly onto the base structure 350 to impart thereon the desired functional characteristics such as improved wear or abrasion resistance.

Figure 4:
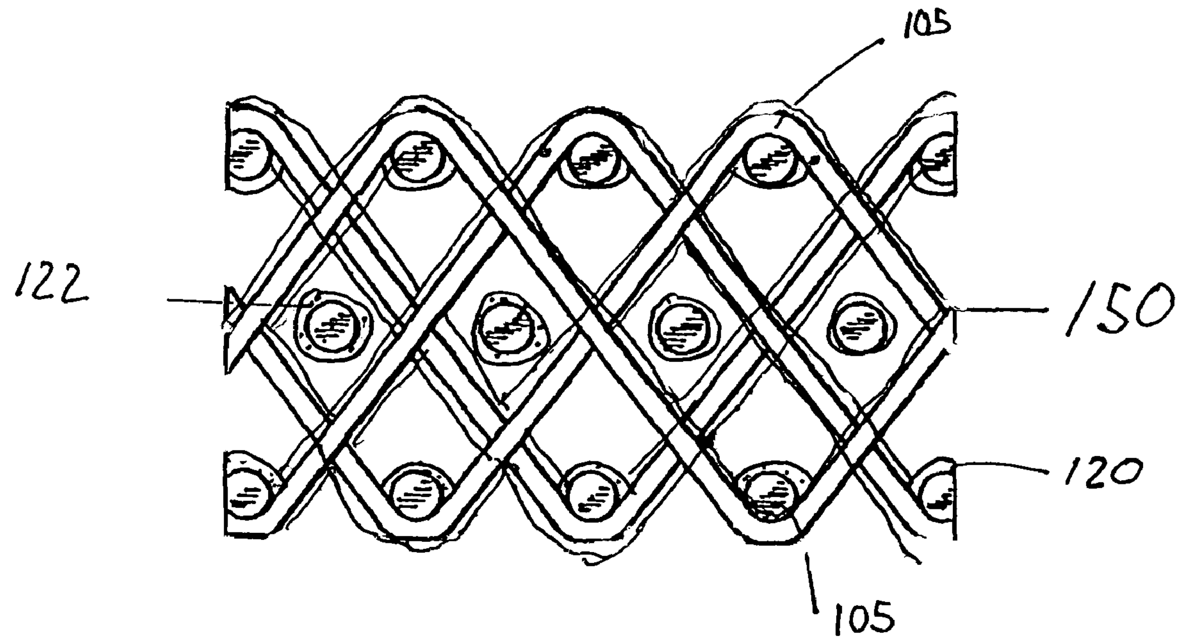
FIG. 4 is a cross section view of a fabric according to the present invention having a coating applied to the yarns of the fabric.
Figure 5:
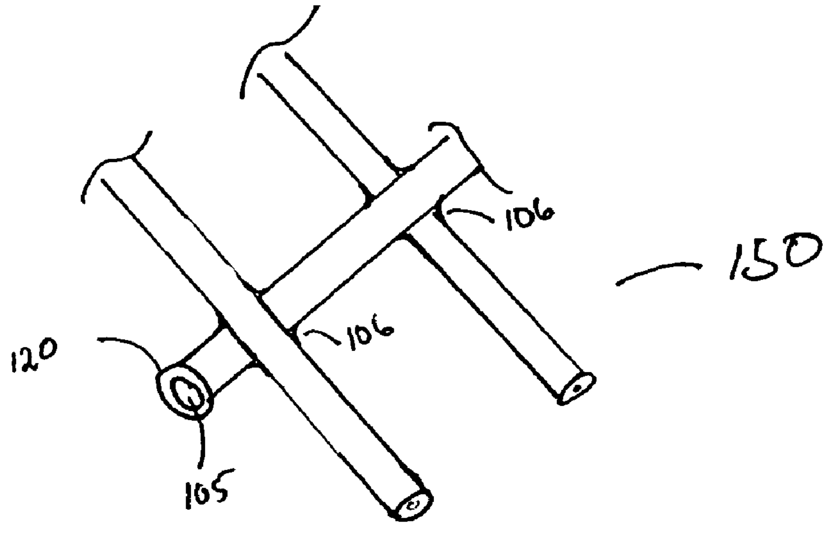
FIG. 5 is a close-up view of a fabric according to the present invention having a coating applied thereto.
Figure 6:
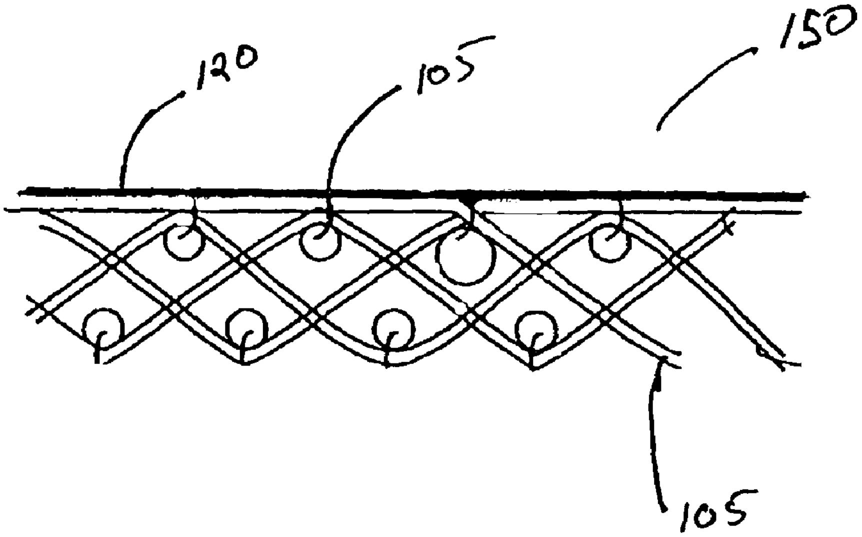
FIG. 6 is a cross section view of a fabric according to the present invention having a coating applied to a top surface thereof.

FIG. 4 depicts a further aspect of the present invention. In FIG. 4, a fabric 150 is shown, which in some instances, will be used as a base support structure, as shown in FIG. 1. The fabric includes yarns 105 onto which a coating 120 has been directly applied thereto. In this example, the coating 120 is applied to create a sheath on individual yarns 105 of the structure. Alternatively, as shown in FIG. 5 the coating 120 may be applied so as to coat the yarns such that the coating completely covers the knuckles or crossovers 106 where the yarns 105 contact. In yet a further embodiment, as shown in FIG. 6 either the upper surface yarns or the backside surface yarns of the fabric 150 may be selectively coated with a coating 120. It will be appreciated that such embodiments may remain permeable to fluids after application of the coating, depending on the desired characteristics of the fabric and its intended use. Further, the coating may also include organic or inorganic particles 122 as previously discussed which can be used for example to alter the hydrophilic or hydrophobic character of the yarns or any one or more of the functional characteristics as aforesaid, among other things.

Although the present invention is described as applying a coating or as creating a layer by a coating process to the outer surface(s) of a fabric or belt, the invention is not so limited. The present invention also includes applying a coating, with or without nanometric sized particles, as a stratified layer within the interior of a belt (e.g. a reinforcement layer where stresses are concentrated) in a multilayer or laminate.

Although preferred embodiments of the present invention and modifications thereof have been disclosed and described in detail herein, it is to be understood that this invention is not limited to those precise embodiments and modifications, and that other modifications and variations may be effected by one skilled in the art without departing from the spirit and scope of the invention as defined by the appended claims.

What is claimed is:

1. An improved industrial fabric or belt, comprising:

a woven base support structure for said industrial fabric or belt; and at least one thermally sprayed continuous coating comprising a thermoplastic resin and/or a thermoset resin provided directly or indirectly on said woven base support structure, wherein the improvement consists of applying said continuous coating by a thermal spray process so as to coat individual yarns of the woven base support structure but not create a layer of the fabric or belt and such that the individual yarns of the fabric or belt are sheathed in the coating material, and wherein the industrial fabric or belt is for an industrial machine selected from the group consisting of a papermaking machine, a nonwoven manufacturing machine, or a corrugator machine.

2. The fabric or belt according to claim 1, wherein said thermal spray process is a flame spray process, electric wire arc spray process, a plasma spray process, a detonation gun deposition process, a cold spray process or a high velocity oxygen fuel combustion spray process.

3. The fabric or belt according to claim 1, wherein said coating further comprises functional organic or inorganic or metallic particles or a combination thereof being non-aggregated and nanometric size or larger.

4. The fabric or belt according to claim 3, wherein said particles are distributed substantially uniformly throughout said coating.

5. The fabric or belt according to claim 1, wherein said coating is substantially impermeable to fluid.

6. The fabric or belt according to claim 1, wherein said coating has a thickness in the range of about 0.1-10 mm.

7. The fabric or belt according to claim 6, wherein said coating has a thickness in the range of about 0.2-0.4 mm.

8. The fabric or belt according to claim 3, wherein said particles include silica-based particles, alumina, titania, zirconia, clay, metal, alone or in combination.

9. The fabric or belt according to claim 8, wherein said particles have a particle size of approximately 7 nm.

10. The fabric or belt according to claim 1, further comprising, a coating applied to a first side of said base support structure or a coating applied to a second side of said base support structure, or a coating applied to both sides with said coating being applied by conventional methods or by thermal spraying or a combination thereof.

11. The fabric or belt according to claim 10, wherein one of said coatings is a bond-coat layer applied by a conventional method or by a thermal spray method.

12. The fabric or belt according to claim 10, wherein said coating comprises a thermoplastic and/or thermoset material.

13. The fabric or belt of claim 1, wherein the woven base support structure comprises yarns with the coating applied to the individual yarns to form a sheath on said yarns and the knuckles or crossovers of the yarns of the woven base support structure of the fabric or belt.

14. The fabric or belt of claim 13, wherein the coating includes organic or inorganic or metallic particles or combination thereof.

15. The fabric or belt in accordance with claim 1, wherein said coating imparts one or more of the following functional characteristics:

abrasion resistance,
thermal resistance,
oxidation resistance,
chemical resistance,
a moisture barrier,
thermal conductivity,
electrical conductivity,
balancing of hydrophobic and hydrophilic properties,
enhancing or reducing coefficients of friction as desired for a particular process, and
a creation of microtopology on the fabric.

16. An improved industrial fabric or belt, comprising:

a woven base support structure for said industrial belt or fabric; and at least one thermally sprayed coating comprising a thermoplastic resin and/or a thermoset resin provided directly or indirectly on said woven base support structure, wherein the improvement consists of applying said continuous coating by a thermal spray process, and wherein said coating further comprises functional organic or inorganic or metallic particles or a combination thereof being nanometric size or larger which forms a coating which is continuous and which coats individual yarns of the woven base support structure but does not create a layer of the fabric or belt and such that the yarns individual of the fabric or belt are sheathed in the coating material, and wherein the industrial fabric or belt for an industrial machine is selected from the group consisting of a papermaking machine, a nonwoven manufacturing machine, or a corrugator machine.

17. An industrial fabric or belt, comprising:

a woven base support structure for an industrial fabric or belt; and at least one thermally sprayed continuous coating comprising a thermoplastic resin and/or a thermoset resin provided directly or indirectly on said woven base support structure, wherein the improvement consists of applying said continuous coating by a thermal spray process that coats individual yarns of the woven base support structure but does not create a layer of the fabric or belt and such that the individual yarns of the fabric or belt are sheathed in the coating material, wherein said coating further comprises functional organic or inorganic or metallic particles or a combination thereof being non-aggregated and including nanometric size particles, wherein the particles are distributed substantially uniformly throughout the coating, and wherein the industrial fabric or belt for an industrial machine is selected from the group consisting of a papermaking machine, a nonwoven manufacturing machine, or a corrugator machine.

* * * * *